(12) United States Patent
Oomori et al.

(10) Patent No.: US 8,034,876 B2
(45) Date of Patent: Oct. 11, 2011

(54) ORGANIC FIBER-REINFORCED COMPOSITE RESIN COMPOSITION AND ORGANIC FIBER-REINFORCED COMPOSITE RESIN MOLDED ARTICLE

(75) Inventors: Masatoshi Oomori, Yokkaichi (JP); Takayuki Itou, Yokkaichi (JP); Takakazu Yoshihara, Yokkaichi (JP); Taku Kitade, Yokkaichi (JP)

(73) Assignees: Mitsubishi Chemical Corporation, Tokyo (JP); Teijin Fibers Limited, Osaka (JP)

( * ) Notice: Subject to any disclaimer, the term of this patent is extended or adjusted under 35 U.S.C. 154(b) by 111 days.

(21) Appl. No.: 12/513,095

(22) PCT Filed: Nov. 6, 2007

(86) PCT No.: PCT/JP2007/071520
§ 371 (c)(1),
(2), (4) Date: Apr. 30, 2009

(87) PCT Pub. No.: WO2008/056646
PCT Pub. Date: May 15, 2008

(65) Prior Publication Data
US 2010/0120987 A1     May 13, 2010

(30) Foreign Application Priority Data

Nov. 7, 2006  (JP) ................................ 2006-301113
Nov. 7, 2006  (JP) ................................ 2006-301114

(51) Int. Cl.
*C08L 23/12*  (2006.01)
*C08L 23/14*  (2006.01)
*C08L 23/16*  (2006.01)
*C08L 53/00*  (2006.01)

(52) U.S. Cl. ........ 525/108; 525/120; 525/125; 525/131; 525/145; 525/164; 525/179; 525/184

(58) Field of Classification Search ........................ None
See application file for complete search history.

(56) References Cited

U.S. PATENT DOCUMENTS

| | | | |
|---|---|---|---|
| 3,855,168 A * | 12/1974 | Ozeki et al. .................... | 524/510 |
| 4,857,405 A * | 8/1989 | Cordova et al. ............... | 428/378 |
| 4,968,555 A | 11/1990 | Landler | |
| 6,294,600 B1 * | 9/2001 | Takada et al. .................. | 524/105 |
| 7,037,578 B2 * | 5/2006 | Lofgren ....................... | 428/295.1 |

FOREIGN PATENT DOCUMENTS

| | | |
|---|---|---|
| EP | 397881 A1 * | 11/1990 |
| JP | 01-158044 A | 6/1989 |
| JP | 02-124956 A | 5/1990 |
| JP | 7-331583 A * | 12/1995 |

\* cited by examiner

*Primary Examiner* — Robert Sellers
(74) *Attorney, Agent, or Firm* — Sughrue Mion, PLLC

(57) ABSTRACT

There are provided an organic fiber-reinforced composite resin composition which is good in fiber dispersion, excellent in appearance, excellent in mechanical properties such as tensile elongation at break or impact strength and easy in thermal recycle; and a molded article obtained therefrom.

An organic fiber-reinforced composite resin composition comprising (a) 60 to 95% by weight of a polyolefin resin (provided that an acid-modified polyolefin resin is excluded) and (b) 40 to 5% by weight (provided that (a)+(b)=100% by weight) of organic fiber to which a polar resin (provided that an acid-modified polyolefin resin is excluded) is attached, or an organic fiber-reinforced composite resin composition comprising organic fiber in an amount of 10 to 200 parts by weight based on 100 parts by weight of a polyolefin resin and having an Izod impact strength at −40° C. of 10 kJ/m$^2$ or more, and further, an organic fiber-reinforced composite resin molded article obtained therefrom.

10 Claims, No Drawings

ORGANIC FIBER-REINFORCED COMPOSITE RESIN COMPOSITION AND ORGANIC FIBER-REINFORCED COMPOSITE RESIN MOLDED ARTICLE

TECHNICAL FIELD

The present invention relates to an polyolefin composite resin composition reinforced with organic fiber, which is good in fiber dispersion, excellent in appearance, excellent in tensile elongation at break or mechanical strength such as impact strength, easy in thermal recycle and suitable for vehicles, architecture and civil engineering, machine parts, electronic parts and the like, and a molded article obtained therefrom.

BACKGROUND ART

Techniques of mixing fibrous inorganic fillers with polyolefin resins in order to improve heat resistance and rigidity of the polyolefin resins have already been known, and utilized in many fields including automotive materials. Above all, molded articles obtained by adding glass fiber which is a fibrous inorganic fiber having thin fiber diameter and high aspect ratio to the polyolefin resins are attracting attention because they have high rigidity. However, the fiber-reinforced resins reinforced with the inorganic fillers like this pose problems of decreased impact resistance and discarding. In order to solve such problems, it has been tried to replace the fibrous in organic fillers such as glass fiber with organic fiber.

Patent document 1 discloses an organic fiber-containing resin composition composed of a polyolefin, organic fiber and inorganic fiber. It is described that a fiber-reinforced resin composition having high mechanical strength and elasticity and excellent in impact resistance can be obtained by combining the organic fiber and the inorganic fiber. However, the inorganic fiber is contained as described above, so that discarding thereof is difficult, and ash of the inorganic fiber remains after thermal recycle.

Patent document 2 and the like disclose a polyolefin resin composition obtained by biaxial kneading of a mixture of a polyolefin having a melting point of 170° C. or less and an inorganic filler with synthetic fiber having a melting point of 200° C. or more. It is described that according to this invention, impact strength and rigidity can be improved without decreasing dimensional stability, surface smoothness, rigidity and hardness, for example, by adding the tabular inorganic filler to the polyolefin, and thereafter, adding the organic fiber. However, the inorganic filler such as a hydroxide or inorganic filler is added, so that the problem of remaining ash still remains unsolved.

In order to solve these problems, various methods are disclosed. For example, patent document 3 discloses a technique of using organic fiber having a melting point 50° C. or more higher than that of a polyolefin resin as a reinforcing material, heating the polyolefin resin at a temperature 40° C. or more higher than the melting point thereof, and performing impregnation to the organic fiber within the range that the impregnation time does not exceed 6 seconds. It is described that thermal degradation of the reinforcing fiber does not occur and breakage thereof is also decreased, resulting in being able to obtain an excellent organic fiber-reinforced resin composition.

However, according to this method in which the organic fiber is merely immersed in a molten resin bath of the polyolefin resin and then pulled out, there have been problems of extremely low fiber dispersibility in the polyolefin resin, increased strength variation of a molded article associated with unevenly distributed fiber, and further, poor surface appearance of the molded article.

Further, patent document 4 discloses that a molded article which is strong and has high rigidity and good appearance is obtained by using organic fiber-reinforced resin pellets in which organic fiber has a melting point of 150° C. or more and 30° C. or more higher than the melting point of a resin composition, a monofilament fineness of 0.1 to 20 dtex and a total fineness of 2,000 to 700,000 dtex, and 65% or more of the total surface area of the organic fiber is in contact with the resin composition. The dispersion and the appearance of the molded article are improved thereby to some degree, but still insufficient. Furthermore, the fiber used requires the specified fineness, so that it has a limitation also in control of physical properties as an organic fiber composite material.

Patent document 5 discloses an organic fiber-reinforced resin using organic fiber which is surface treated with a bundling agent containing a nucleating agent having a nucleating function. However, even when this method is used, opening of the fiber is insufficient to cause poor dispersion. As a result, only a molded article having poor appearance is obtained.

Patent document 6 discloses a method of coating fiber surfaces with an acid-modified polyolefin resin or adding the acid-modified polyolefin resin into a polyolefin resin. However, even when this method is used, organic fiber dispersion is still insufficient, and breaking elongation also considerably decreases, although interface strength between the resin and the fiber increases.

Patent document 5 discloses an organic fiber-reinforced resin using organic fiber which is surface treated with a bundling material containing a nucleating agent having a nucleating function. However, even when this method is used, opening of the fiber is insufficient to cause poor dispersion. As a result, only a molded article having poor appearance is obtained.

Patent document 6 discloses a method of coating fiber surfaces with an acid-modified polyolefin resin or adding the acid-modified polyolefin resin into a polyolefin resin. However, even when this method is used, organic fiber dispersion is still insufficient, and breaking elongation also considerably decreases, although interface strength between the resin and the fiber increases.

Patent Document 1: JP-A-4-202545
Patent Document 2: JP-A-6-306216
Patent Document 3: Japanese Patent No. 3073988
Patent Document 4: JP-A-2005-040996
Patent Document 5: JP-A-2002-167518
Patent Document 6: Japanese Patent No. 2941320

DISCLOSURE OF THE INVENTION

Problem that the Invention is to Solve

A problem that the invention is to solve is to provide an organic fiber-reinforced composite resin composition which is good in fiber dispersion, excellent in appearance, excellent in tensile elongation at break or mechanical strength such as impact strength and easy in thermal recycle; and a molded article obtained therefrom.

Means for Solving the Problems

The invention relates to an organic fiber-reinforced composite resin composition comprising (a) 60 to 95% by weight of a polyolefin resin (provided that an acid-modified polyolefin resin is excluded) and (b) 40 to 5% by weight (provided that (a)+(b)=100% by weight) of organic fiber to which a polar resin (provided that an acid-modified polyolefin resin is excluded) is attached.

As the polyolefin resin (a) as used herein, a propylene resin is preferred.

Further, as the polar resin constituting (b), a thermosetting resin is preferred, and more preferred is an epoxy resin.

Still further, in (b), the amount of the polar resin attached is preferably from 0.01 to 5% by weight based on the organic fiber.

Furthermore, the organic fiber constituting (b) is preferably one having a melting point of 200° C. or more, and more preferably polyester fiber or polyamide fiber.

Then, the invention relates to an organic fiber-reinforced composite resin molded article obtained by molding the above organic fiber-reinforced composite resin composition, and preferably an organic fiber-reinforced composite resin molded article obtained by injection molding.

Advantages of the Invention

According to the organic fiber-reinforced composite resin composition of the invention comprising the polyolefin resin (a) and the polar resin-attached organic fiber (b), excellent mechanical physical properties can be obtained by a good reinforcing effect due to the organic fiber, and extremely good fiber dispersion can be expressed by the following effect. As a result, the molded article also having good appearance can be obtained. Further, interfacial adhesion between the fiber and the matrix resin is weakened, so that mechanical characteristics of high tensile elongation at break and good toughness which are most unlikely to happen in usual organic fiber-reinforced composite materials can also be obtained.

That is to say, in the organic fiber-reinforced composite resin composition of the invention, the fibers can be prevented from being folded and entangled with one another by using the polar resin-attached organic fiber in the polyolefin resin matrix as a nonpolar resin. Although the cause of this is uncertain, it is assumed that the fibers are dispersed in the matrix without adhering to one another by coating of surfaces of the fibers, even in the case where the fibers reach a temperature equal to or higher than the glass transition point thereof when fiber-reinforced composite resin pellets are being melted.

Further, the organic fiber is excellent in elasticity and ductility compared to glass fiber or carbon fiber, so that it is hard to break in a molding process. For this reason, the length of the organic fiber is sufficiently maintained in the molded article, resulting in obtaining the excellent reinforcing effect due to the organic fiber.

BEST MODE FOR CARRYING OUT THE INVENTION

[Polyolefin Resin (a)]

There is no particular limitation on the polyolefin resin (a) used in the invention, and various polyolefin resins can be used. Examples thereof include ethylenic resins such as an ethylene homopolymer and a copolymer comprising ethylene as a main component and one or two or more of other α-olefins such as propylene and 1-butene and the like; propylene resins such as a propylene homopolymer and a copolymer comprising propylene as a main component and one or two or more of other α-olefins such as ethylene and 1-butene and the like; butene-based resins such as a 1-butene homopolymer and a copolymer comprising 1-butene as a main component and one or two or more of other α-olefins such as ethylene and propylene and the like; and the like. These polyolefin resins may be either a homopolymer or a copolymer, and further, may be either a random copolymer or a block copolymer.

Incidentally, the term "main component" described above means one contained in the polyolefin resin in an amount of 50% by weight or more, preferably 60% by weight or more.

Of these, the propylene resins are preferred in terms of excellent heat resistance. Specific examples thereof include, for example, a propylene homopolymer, a propylene-ethylene random copolymer resin and a propylene-ethylene block copolymer resin, that the both comprise propylene as a main component, and the like.

In the invention, the propylene resin is a propylene homopolymer or a copolymer containing propylene as repeating units. In the copolymer, the propylene repeating units are preferably contained in an amount of 50 mol % or more, particularly 60 mol % or more.

For polymerization mode of the polyolefin resin, any polymerization mode may be employed as long as a resinous material is obtained. However, a gas phase method and a solution method are particularly preferred.

In the above polyolefin resin (a), the lower limit of the melt flow rate measured at a temperature of 230° C. and a load of 21.18 N in accordance with JIS K7210 is preferably 0.05 g/10 min, and more preferably 0.1 g/10 min. On the other hand, the upper limit thereof is preferably 200 g/10 min, and more preferably 100 g/10 min. When the melt flow rate is equal to or more than the above-mentioned lower limit, molding processability is improved, and the surface appearance of the resulting molded article tends to become good. On the other hand, when the flow rate is equal to or less than the above-mentioned upper limit, the mechanical strength of the organic fiber-reinforced composite resin molded article and organic fiber dispersion tend to become good.

In the organic fiber-reinforced composite resin molded article of the invention, the polyolefin resins (a) may be contained either alone or as a mixture of two or more thereof.

[Polar Resin-Attached Organic Fiber (b)]

There is no particular limitation on the polar resin-attached organic fiber (b) used in the invention as long as the polar resin is attached to the organic fiber, and examples thereof include various ones.

Incidentally, the term "polar" as used herein means a property of a compound which is higher in polarity than the nonpolar polyolefin resin (a).

The polar resins used in the invention include, for example, thermosetting resins such as an unsaturated polyester, a vinyl ester resin, an epoxy resin, a phenol (resol type) resin, a urea-melamine resin, a polyimide, an urethane resin and copolymers and modified polymers thereof. Further, they also include thermoplastic resins such as a saturated polyester, a polyamide, an acrylic resin, and copolymers and modified polymers thereof. As the polar resin, the epoxy resin or the urethane resin of the thermosetting resin is preferred particularly from the viewpoints of handling-processability and mechanical characteristics, and more preferred is the epoxy resin.

Specific examples of the above-mentioned epoxy resins (including epoxy compounds) include ethylene glycol diglycidyl ether and polyethylene glycol diglycidyl ether, propylene glycol diglycidyl ether and polypropylene glycol diglycidyl ether, 1,4-butanediol diglycidyl ether, neopentyl glycol diglycidyl ether, polytetramethylene glycol diglycidyl ether, polyalkylene glycol diglycidyl ether and the like as diglycidyl ether compounds, and further, glycerol polyglycidyl ether, diglycerol polyglycidyl ether, polyglycerol polyglycidyl ether, sorbitol polyglycidyl ether, arabitol polyglycidyl ether, trimethylolpropane polyglycidyl ether, pentaerythritol polyglycidyl ether, polyglycidyl ethers of aliphatic polyhydric alcohols and the like as polyglycidyl ether compounds. Preferred is an aliphatic polyglycidyl ether compound having high reactive glycidyl groups, and more preferred is polyethylene glycol diglycidyl ether, polypropylene glycol diglycidyl ether, alkane diol diglycidyl ether or the like.

Incidentally, the acid-a modified resin of the polyolefin resin, for example, an acid-modified polyolefin resin modified with maleic anhydride, is excluded from the above-mentioned polyolefin resin (a) and the polar resin used on (b). This is because use of the polyolefin resin modified with such a polar group-containing compound increases the interface strength between the polyolefin resin as the matrix resin and the fiber, which causes poor tensile elongation at break.

The above-mentioned acid-modified polyolefin resins as used herein include (i) an olefin homopolymer or a copolymer of two or more olefins, for example, one in which an unsaturated carboxylic acid or a derivative thereof is graft polymerized to a polyolefin, (ii) one in which one or two or more of olefins as polymerizing raw material monomers for a polyolefin and one or two or more of unsaturated carboxylic acids or derivatives thereof are copolymerized, (iii) one in which an unsaturated carboxylic acid or a derivative thereof is further graft polymerized to the one obtained in the above (ii), and the like.

On the other hand, examples of the organic fiber constituting (b) include, for example, polyester-based fiber, polyamide-based fiber, polyurethane-based fiber, poly-acrylonitrile-based fiber, kenaf, cellulose-based fiber and the like. In the organic fiber-reinforced composite resin composition of the invention, the organic fiber may be contained either only alone or as a mixture of two or more thereof. Of these, the polyester-based fiber or the polyamide-based fiber is preferred from the viewpoints of handling-processability and mechanical characteristics, and particularly, it is preferred to use PET (polyethylene terephthalate) fiber (melting point: 260° C., glass transition temperature: 67° C.) or PEN (polyethylene naphthalate) fiber (melting point: 272° C., glass transition temperature: 113° C.). When the polyester-based fiber is used, the injection-molded article having good mechanical physical properties is obtained because of good dispersion in the injection-molded article and high physical properties as the fiber.

By the way, when the organic fiber-reinforced composite resin composition of the invention is molded by injection molding, it is performed at a molding temperature equal to or higher than the melting point of the polyolefin resin (a). Accordingly, as the organic fiber, there is preferably used one which does not melt even when injection molded. That is to say, the melting point of the polyolefin resin (a) is usually about 70 to about 170° C., so that the molding temperature (taken as the outlet temperature of a molding machine) is about 150 to about 210° C. With respect to a material for the organic fiber constituting (b), selection of the material having a melting point equal to or 10° C. or more, preferably 20° C. or more higher than this molding temperature produces good results, so that the melting point of the organic fiber is preferably 200° C. or more.

Further, when the fiber diameter of the organic fiber is too thick, the Izod impact strength of the molded article decreases. As the fiber having a thin fiber diameter, nanosize fiber is considered to also be usable, and there is the possibility of becoming very good depending on the use of the molded article. As described above, the fiber diameter used covers a wide range, so that the number of fibers used can not be specified. However, when considered as the cross-sectional area of a fiber bundle, the cross-sectional area of fibers will usually accounts for about 5 to about 60% of the cross-sectional area in a direction approximately perpendicular to the fiber of the pellet.

Incidentally, the monofilament fineness of the organic fiber is usually from 1 to 20 dtex, and preferably from about 2 to about 15 dtex.

Further, the total fineness of the organic fiber is not particularly limited, but it is usually from 150 to 3,000 dtex, and preferably from 250 to 2,000 dtex.

Furthermore, the filament number of the organic fiber is not particularly limited, but it is usually from 10 to 1,000 filaments, and preferably from 50 to 500 filaments.

Methods for producing the polar resin-attached organic fiber (b) in the invention include a method of first imparting a compound incompatible or unreactable with the polyolefin resin (a) and having polarity before the organic fiber is taken up in a cheese form in a process of producing the organic fiber, and/or a method of impregnating the organic fiber with a compound incompatible or unreactable with the polyolefin resin (a) and having polarity after the organic fiber is once taken up and performing heat treatment. Either method may be employed as long as the effects of the invention are not impaired.

Here, the amount of the polar resin attached to the organic fiber constituting (b) is usually from 0.01 to 5% by weight, and preferably from 0.03 to 3.5% by weight. Less than 0.01% by weight results in difficulty in obtaining the effect of weakening the interfacial adhesion between the fiber and the matrix resin. Further, the fibers are entangled with one another during molding, so that dispersion of the fibers is deteriorated. As a result, appearance quality is poor. On the other hand, exceeding 5% by weight results in deteriorated processability because the fiber becomes too hard, leading to difficulty in obtaining an organic fiber composite.

The length of the above polar resin-attached organic fiber (b) corresponds to the length of the pellet of the composition of the invention, which will be described later, and the average fiber length of the organic fiber contained in the pellet comprising the polyolefin resin (a) is preferably from 4 mm to 50 mm, more preferably from 4 mm to 20 mm, and particularly preferably from 4 mm to 10 mm. When the average fiber length of the organic fiber is less than 4 mm, the effect of improving the impact strength is not sufficiently obtained. On the other hand, when the average fiber length exceeds 50 mm, molding becomes difficult.

It is indispensable that the content of the polyolefin resin (a) and the polar resin-attached organic fiber (b) in the organic fiber-reinforced composite resin composition of the invention is within the range where component (a) is from 60 to 95% by weight and the component (b) is from 40 to 5% by weight (provided that (a)+(b)=100% by weight), based on the total amount of components (a) and (b). Preferably, the content of component (a) is from 65 to 90% by weight, and the content of component (b) is from 35 to 10% by weight. When the content of the polar resin-attached organic fiber (b) is smaller than the above-mentioned range, the effect of improving the mechanical strength becomes poor. On the other hand, when the content is large, dispersion of the fibers is deteriorated. As a result, product appearance is also deteriorated.

Preparation of Organic Fiber-Reinforced Composite Resin Composition (Organic Fiber-Reinforced Resin Pellets) of the Invention:

The organic fiber-reinforced composite resin composition of the invention is obtained by a pultrusion method of impregnating the polar resin-attached organic fiber (b) with the polyolefin resin (a) while pulling the fiber. For example, a resin additive is added to the above-mentioned polyolefin resin (a) as needed, and the polyolefin resin (a) is supplied in a molten state from an extruder to a cross head die while pulling the polar resin-attached organic fiber (b) through the cross head die to impregnate the organic fiber with the polyolefin resin (a). The melt-impregnated product is heated, and cut at right angles to a pulling direction after cooling to obtain pellets. The organic fibers are arranged in parallel with one another at the same length in a length direction of the resulting pellets.

Pultrusion is basically one in which a continuous reinforcing fiber bundle is impregnated with a resin while pulling it, and there have been known a method of allowing a fiber bundle to pass through an impregnating bath in which an emulsion, a suspension or a solution of a resin is placed, thereby performing impregnation, a method of spraying a powder of a resin to a fiber bundle or allowing the fiber bundle to pass through a tank in which the powder is placed to adhere the resin powder to the fiber, and then, melting the resin, thereby performing impregnation, and the like, as well as the above-mentioned method of supplying the resin from the extruder or the like to the cross head while allowing the fiber bundle to pass through the cross head, thereby performing impregnation. In the invention, any one can be utilized. Particularly preferred is the cross head method. Further, a resin impregnating operation in these pultrusion methods is generally performed by one step, but this may be divided into two or more steps, and further, a different impregnating method may be used to perform impregnation.

Incidentally, as the resin additive added to the polyolefin resin (a) as needed, it is also possible to supplementarily use together one or two or more of thermoplastic resins in small amounts. Further, in order to impart desired characteristics according to the purpose, it is also possible to further incorporate a known material generally added to a thermoplastic resin, for example, a stabilizer such as an antioxidant, a heat resist stabilizer or an UV absorber, an antistatic agent, a flame retardant, a flame retardant aid, a coloring agent such as a dye or a pigment, a lubricant, a plasticizer, a crystallization accelerator, a nucleating agent or the like.

The impregnation is performed at 150 to 300° C., preferably at 170 to 260° C., and more preferably at 190 to 230° C., or the melt-impregnated product is heated at the above-mentioned temperature. When the heating temperature is lower than the above-mentioned range, the impregnation becomes insufficient. When it is too high, decomposition of the polyolefin resin (a) occurs together.

The melt-impregnated product is extruded after heating reaction to form a strand, which is cooled to a temperature at which the strand can be cut, and cut with a cutter to form pellets. The shape of the pellets is not particularly limited, and specific examples thereof include column-shaped, prism-shaped, plate-shaped and dice-shaped forms. In the pellets thus obtained, the organic fibers have the substantially same length, and the direction of the respective fibers is equal to an extruded direction, that is to say, the length direction of the pellets.

Further, the above-mentioned pellets may be a mixture of two or more of the organic fibers different in kind or concentration and different polyolefin resins (a).

Incidentally, the pellets of the invention are also used as pellets in the broad sense of the term including strand-shaped, sheet-shaped and tabular pellets, as well as the above-mentioned pellets in the narrow sense.

The size of the pellet formed of the organic fiber—reinforced composite resin composition of the invention is from 4 to 50 mm, preferably from 4 to 20 mm, and more preferably from 4 to 10 mm, which is the length of the organic fiber as described above. When the length of the organic fiber in the pellet is shorter than the above-mentioned range, mechanical physical properties desired as a composite material is not obtained. On the other hand, when the length is too long, it becomes difficult to supply the pellets to the injection molding machine used or the like.

Production of Organic Fiber-Reinforced Composite Molded Article:

The resulting pellets are independently used or diluted with another thermoplastic resin, preferably a resin of the same type as the polyolefin resin (a) to be used as a raw material for injection molding or the like. The kind and ratio of resin used for dilution is determined according to desired physical properties of the molded product.

In the molded article obtained by injection molding using the organic fiber-reinforced composite resin composition (pellets) of the invention, use of the organic fiber decreases breakage at the time of injection molding and causes uniform fiber dispersion.

Further, the invention relates to an organic fiber-reinforced composite resin composition comprising organic fiber in an amount of 10 to 200 parts by weight based on 100 parts by weight of the above-mentioned polyolefin resin (a) and having an Izod impact strength at −40° C. of 10 kJ/m$^2$ or more. When the content of the organic fiber is less than 10 parts by weight herein, it becomes difficult to allow the above-mentioned impact strength to achieve the intended value. On the other hand, exceeding 200 parts by weight results in a relative decrease in quantitative ratio of the polyolefin resin, thereby causing a significant decrease in fluidity of the composition to lead to a material poor in moldability.

One method for obtaining this composition is to produce the organic fiber-reinforced composite resin composition containing the above-mentioned polyolefin resin (a) and the above-mentioned polar resin-attached organic fiber (b). Preferred modes of the polyolefin resin (a) and the polar resin-attached organic fiber (b) are as described above.

Another method for obtaining this composition is to produce the organic fiber-reinforced composite resin composition containing the polyolefin resin and the organic fiber, and to knead it again to improve organic fiber dispersion. The kneading temperature is preferably from 160 to 220° C. and particularly from 180 to 220° C. for first kneading, and preferably from 160 to 220° C. and particularly from 180 to 220° C. for second kneading.

A method for producing the organic fiber-reinforced composite resin composition subjected to kneading again and a preferred mode thereof are the same as those of the organic fiber-reinforced composite resin composition containing the above-mentioned polyolefin resin and the above-mentioned polar resin-attached organic fiber. However, the polar resin attached to the organic fiber can be omitted by performing kneading again. Further, it becomes possible to use an acid-modified polyolefin resin as the polyolefin resin.

Another method for obtaining this composition is to produce the organic fiber-reinforced composite resin composition containing the polyolefin resin and the organic fiber, and to knead it again to improve organic fiber dispersion. The kneading temperature is preferably from 160 to 220° C. and particularly from 180 to 220° C. for first kneading, and preferably from 160 to 220° C. and particularly from 180 to 220° C. for second kneading.

A method for producing the organic fiber-reinforced composite resin composition subjected to kneading again and a preferred mode thereof are the same as those of the organic fiber-reinforced composite resin composition containing the above-mentioned polyolefin resin and the above-mentioned polar resin-attached organic fiber. However, the polar resin attached to the organic fiber can be omitted by performing kneading again. Further, it becomes possible to use an acid-modified polyolefin resin as the polyolefin resin.

In the above-mentioned organic fiber-reinforced composite resin composition of the invention, the Izod impact strength at −40° C. is 20 kJ/m$^2$ or more, preferably 25 kJ/m$^2$, and particularly preferably 30 kJ/m$^2$, in terms of ensuring impact resistance at low temperature. Less than 20 kJ/m$^2$ results in an increased risk of breakage at small deformation or damage to surrounding things or persons by a sharp edge face formed by brittle fracture, when impact is applied to a member using this material in a low-temperature use environment such as a cold region.

One method for adjusting the above-mentioned Izod impact strength to 20 kJ/m$^2$ or more in the resin composition of the invention is to produce the organic fiber-reinforced composite resin composition containing the above-mentioned polyolefin resin (a) and the above-mentioned polar resin-attached organic fiber (b). Preferred modes of the polyolefin resin (a) and the polar resin-attached organic fiber (b) are as described above.

Another method is to produce the organic fiber-reinforced composite resin composition containing the polyolefin resin and the organic fiber, and to knead it again to improve organic fiber dispersion. A preferred mode of this method is as described above. Omission of the polar resin and the possibility of using the acid-modified polyolefin resin by second kneading are also the same as described above. On the other hand, when a technique of incorporating a rubber component in large amounts, which has hitherto been widely used, is employed without using the organic fiber, it becomes difficult to impart sufficient rigidity in a high-temperature use environment of ordinary temperature to about 80° C., resulting in extreme difficulty in keeping a balance between impact resistance and rigidity as a material.

Further, in the resin composition of the invention, the flexural modulus is 1,500 MPa or more, preferably 1,800 MPa and more preferably 2,000 MPa or more, in terms of ensuring rigidity. From a realistic viewpoint, 10,000 MPa or less is preferred. When the flexural modulus is less than 1,500 MPa, it is difficult to maintain the structure of the molded article, or the molded article is easily deformed by stress application due to its own weight or attached parts or creep deformed, in some cases.

One method for adjusting the flexural modulus to 1,500 MPa or more is to produce the organic fiber-reinforced composite resin composition containing the above-mentioned polyolefin resin (a) and the above-mentioned polar resin-attached organic fiber (b). Preferred modes of the polyolefin resin (a) and the polar resin-attached organic fiber (b) are as described above.

Another method is to produce the organic fiber-reinforced composite resin composition containing the polyolefin resin and the organic fiber, and to knead it again to improve organic fiber dispersion. A preferred mode of this method is as described above. Omission of the polar resin and the possibility of using the acid-modified polyolefin resin by second kneading are also the same as described above.

Further, in the resin composition of the invention, the tensile elongation at break is 25% or more, preferably 30% or more, and more preferably 35% or more. From a realistic viewpoint, 300% or less is preferred. When dispersibility of the organic fiber is poor, the tensile elongation at break decreases to tend to deteriorate the appearance of the molded article. One method for adjusting the tensile elongation at break to 25% or more is to produce the organic fiber-reinforced composite resin composition containing the above-mentioned polyolefin resin (a) and the above-mentioned polar resin-attached organic fiber (b). Preferred modes of the polyolefin resin (a) and the polar resin-attached organic fiber (b) are as described above.

Another method is to produce the organic fiber-reinforced composite resin composition containing the polyolefin resin and the organic fiber, and to knead it again to improve organic fiber dispersion. A preferred mode of this method is as described above. Omission of the polar resin and the possibility of using the acid-modified polyolefin resin by second kneading are also the same as described above.

Incidentally, the tensile elongation at break can also be improved by incorporating a conventionally known rubber component into the resin composition of the invention as needed.

EXAMPLES

The invention will be described below more specifically with reference to examples, but the invention is not limited by the examples, as long as it does not depart from the gist thereof.

Materials used in the examples and comparative examples and evaluation methods are as shown below.

[Materials Used]

Component (A-1): PET Fiber ["P900AL BHT1670T250" manufactured by Teijin Fibers Ltd., average fiber diameter: 25 μm, epoxy resin pickup=0.2% by weight] epoxy treated by using a polyglycidyl ether-based epoxy resin Component (A-2): PET fiber ["P900M BHT1670T250" manufactured by Teijin Fibers Ltd., average fiber diameter: 25 μm (1,670 dtex)]

Component (b): Polypropylene ["SA06A" manufactured by Japan Polypropylene Corporation, melt flow rate: 60 g/10 min (230° C., 21.2 N load)]

Component (c-1): Polypropylene ["MA3" manufactured by Japan Polypropylene Corporation, melt flow rate: 11 g/10 min (230° C., 21.2 N load)]

Component (C-2): Maleic anhydride (first-grade reagent)

Component (C-3): Peroxide [2,5-dimethyl-2,5-di(tert-butylperoxy)hexane (manufactured by Nippon Oils & Fats Co., Ltd., trade name: "Perhexa 25B")]

[Evaluation Methods]

<Flexural Modulus and Maximum Flexural Stress>

For a bar of 6.4 mm thick×12.7 mm wide×127 mm long obtained by molding, measurement was made under the following conditions in accordance with the ASTM-D-790-98 method.

Test speed: 2 mm/min
Distance between fulcrums: 100 mm

<Izod Impact Strength>

A bar of 6.4 mm thick×12.7 mm wide×127 mm long obtained by molding was cut to half the length thereof, 63.5 mm. For the resulting bar, measurement was made under the following conditions in accordance with the ASTM-D-256-00 method.

Number of revolutions of notch processing: 400 rpm
Feed speed of notch processing: 120 mm/min
Hammer capacity: 60 kgf·cm
Measuring temperatures: 23° C., −40° C.

<Tensile Strength at Break and Tensile Elongation at Break>

For a TYPE-I bar of 3.2 mm thick×12.7 mm wide obtained by molding, measurement was made at a test speed of 50 mm/min in accordance with the ASTM-D-638-02 method.

<Appearance>

A surface of a flat plate of 80 mm×100 mm×2.0 mm thick obtained by molding was visually observed, and evaluated by the following criteria:

Excellent (○): Fiber dispersion is best, fiber bundles not opened are scarcely observed, and the flat plate surface is also smooth.

Acceptable (Δ): Fiber bundles not opened are slightly observed, and there is a little unevenness on the flat plate surface.

Unacceptable (X): Many fiber bundles not opened are observed, and the flat plate surface is rough.

PRODUCTION EXAMPLES

Production Example 1

Production of Modified Polyolefin

Specified amounts of polypropylene (component (c-1)), maleic anhydride powder (component (c-2)) and a peroxide (component (c-3)) were kneaded at the composition shown in Table 1 by using a twin screw extruder ("TEX30" manufactured by JSW, L/D=42, cylinder diameter: 30 mm, cylinder temperature: 50 to 230° C., die head section temperature: 180° C.) to produce modified polypropylene. The resulting modified polypropylene pellets were dissolved in boiling xylene, and reprecipitated in acetone, followed by vacuum drying at 80° C. for 6 hours to a powdery sample. The infrared adsorption spectrum of a film obtained by press molding this sample was measure by using a Fourier transform infrared spectrophotometer (apparatus: Jasco FT/1R-610). A base line was drawn between 1,665 $cm^{-1}$ and 1,827 $cm^{-1}$ of the resulting infrared adsorption spectrum, and the area value therebetween was calculated. From a calibration curve separately prepared and this area value, the total unsaturated carboxylic acid modification amount was determined. As a result, it was 1.1% by weight.

TABLE 1

| Composition Formulation (parts by weight) | Production Example 1 |
|---|---|
| (c-1) Polypropylene | 100 |
| (c-2) Maleic Anhydride | 3 |
| (c-3) Peroxide | 3 |
| Modification Rate (% by weight) | 1.1 |

Production Example 2

Production of Organic Fiber-Containing Polyolefin Resin Pellets

Polypropylene (component (b)), organic fiber components (components (A-1 and A-2)) and modified polypropylene (component (C)) were pultruded at each composition shown in Table 2 by using a twin screw extruder with a cross-head die ("TEX30" manufactured by JSW, L/D=42, cylinder diameter: 30 mm, cylinder temperature: 190 to 220° C., cross head die temperature: 220° C.) to produce organic fiber-reinforced polyolefin resin pellets (Example 1, Examples B1 and B2). Incidentally, the pellet length was adjusted to 8 mm.

Examples 1, B1 and B2

The resulting organic fiber-reinforced polyolefin resin pellets were supplied to an injection molding machine and molded at a cylinder temperature of 210° C., a mold temperature of 70° C., a back pressure of 10 kg/$cm^2$ and a screw revolution speed of 50 rpm to form a flat plate of 80 mm×100 mm×2.0 mm thick, a bar of 6.4 mm thick×12.7 mm wide×127 mm long and a TYPE-I bar of 3.2 mm thick×12.7 mm wide, respectively. The evaluation results are shown in Table 2.

TABLE 2

|  | Example 1 | Example B1 | Example B2 |
|---|---|---|---|
| <Composition Formulation of Composite Resin Composition (parts by weight)> | | | |
| Component A-1 (Epoxy-Treated PET Fiber) | 25 |  | 25 |
| Component A-2 (Normal PET Fiber) | — | 25 |  |
| Component b (Polypropylene) | 75 | 75 | 67.5 |
| Component C (Acid-modified PP) |  |  | 7.5 |
| <Physical Properties> | | | |
| Flexural Modulus (MPa) | 1,790 | 1,770 | 1,910 |
| Izod Impact Strength 23° C. (kJ/$m^2$) | 34 | 25 | 17 |
| Izod Impact Strength −40° C. (kJ/$m^2$) | 27 | 21 | 10 |
| Tensile Strength at break (MPa) | 29 | 30 | 33 |
| Tensile Elongation at break (%) | 38 | 22 | 7 |
| Appearance | ○ | X | Δ |

From Table 2, it is seen that according to the invention, the molded articles excellent in appearance, excellent in tensile elongation at break and mechanical strength such as impact strength and easy in thermal recycle because of no inclusion of inorganic matter such as glass fiber.

Examples 2 to 8

Organic fiber-reinforced polyolefin resin pellets were produced and molded in the same manner as in Example 1 with the exception that the pellet length, the amount of the organic fiber component as component (A-1) and the amount of polypropylene as component (b) were changed as shown in Table 3. The evaluation results are shown in Table 3.

The dispersibility of the organic fiber in the polyolefin resin was improved by attaching the polar resin to the organic fiber, so that the physical properties were improved as described in Table 3.

The longer the pellet length (corresponding to the length of the organic fiber) was, the better the Izod impact strength at −40° C. was Further, the larger the amount of the organic fiber component as component (A-1) was, the better the Izod impact strength at −40° C. and the flexural modulus were. The appearance (unevenness on a surface of the molded article) was better as the amount of the organic fiber component as component (A-1) decreased.

Example B3

Organic fiber-reinforced polyolefin resin pellets having a pellet length of 8 mm were produced in the same manner as in Production Example 2 with the exception that the amounts of polypropylene as component (b) and the organic fiber component as component (A-2) were changed as shown in Table 4. The organic fiber-reinforced polyolefin resin pellets were kneaded by using the same twin screw extruder as in Production Example 2 (cylinder temperature: 180 to 210° C., a normal die was used in place of the cross head die) to obtain organic fiber-reinforced polyolefin resin pellets having a pellet length of 8 mm. The resulting organic fiber-reinforced polyolefin resin pellets were molded in the same manner as in Example 1. The evaluation results are shown in Table 4.

TABLE 3

| | Examples | | | | | | |
|---|---|---|---|---|---|---|---|
| | 2 | 3 | 4 | 5 | 6 | 7 | 8 |
| <Composition Formulation of Composite Resin Composition (parts by weight)> | | | | | | | |
| Component A-1 (Epoxy-Treated PET Fiber) | 43 (30) | 43 (30) | 43 (30) | 43 (30) | 11 (10) | 25 (20) | 67 (40) |
| Component b (Polypropylene) | 100 (70) | 100 (70) | 100 (70) | 100 (70) | 100 (90) | 100 (80) | 100 (60) |
| Pellet Length (mm) | 2 | 4 | 8 | 12 | 8 | 8 | 8 |
| <Physical Properties> | | | | | | | |
| Flexural Modulus (MPa) | 2080 | 2090 | 2120 | 2200 | 1520 | 1640 | 2280 |
| Maximum Flexural Stress (MPa) | 44 | 48 | 50 | 52 | 42 | 45 | 50 |
| Izod Impact Strength 23° C. (kJ/m$^2$) | 25 | 39 | 54 | 56 | 18 | 25 | 61 |
| Izod Impact Strength −40° C. (kJ/m$^2$) | 18 | 35 | 41 | 44 | 15 | 20 | 51 |
| Tensile Strength at break (MPa) | 30 | 36 | 39 | 40 | 31 | 34 | 38 |
| Tensile Elongation at break (%) | 49 | 48 | 50 | 50 | 61 | 59 | 40 |
| Appearance | ○ | ○ | ○ | ○ | ○ | ○ | Δ |

TABLE 4

| | Example B3 |
|---|---|
| <Composition Formulation of Composite Resin Composition (parts by weight)> | |
| Component A-1 (Epoxy-Treated PET Fiber) | — |
| Component A-2 (Normal PET Fiber) | 43(30) |
| Component b (Polypropylene) | 100(70) |
| Pellet Length (mm) | 8 |
| <Physical Properties> | |
| Flexural Modulus (MPa) | 2,010 |
| Maximum Flexural Stress (MPa) | 48 |
| Izod Impact Strength 23° C. (kJ/m$^2$) | 48 |
| Izod Impact Strength −40° C. (kJ/m$^2$) | 38 |
| Tensile Strength at break (MPa) | 40 |
| Tensile Elongation at break (%) | 49 |
| Appearance | ○ |

The contents of all documents cited in the specification, the contents of U.S. Pat. No. 6,395,342 corresponding to Japanese Patent No. 3,073,988 described above, and the contents of the specifications of all first applications based on which this application claims priority under the Paris Convention are hereby incorporated by reference in this application in their entirety.

INDUSTRIAL APPLICABILITY

The molded article obtained from the organic fiber-reinforced composite resin composition of the invention is good in fiber dispersion, excellent in appearance, excellent in tensile elongation at break and mechanical strength such as impact strength, and easy in thermal recycle, so that it is extremely useful in automobile parts, construction materials, light electrical parts such as trays used in a liquid crystal-related or semiconductor-related field, and the like.

The invention claimed is:

1. An organic fiber-reinforced composite resin composition comprising (a) 70 to 90% by weight of a polyolefin resin (provided that an acid-modified polyolefin resin is excluded) and (b) 30 to 10% by weight (provided that (a)+(b)=100% by weight) of an organic fiber to which a polar resin is attached, wherein the polar resin constituting (b) is an epoxy resin, wherein the organic fiber-reinforced composite resin composition is a melt-impregnated product.

2. The organic fiber-reinforced composite resin composition according to claim 1, wherein the polyolefin resin (a) is a polypropylene resin.

3. The organic fiber-reinforced composite resin composition according to claim 1, wherein the amount of the polar resin attached in (b) is from 0.01 to 5% by weight based on the organic fiber.

4. The organic fiber-reinforced composite resin composition according to claim 1, wherein the organic fiber constituting (b) has a melting point of 200° C. or more.

5. The organic fiber-reinforced composite resin composition according to claim 4, wherein the organic fiber constituting (b) is polyester fiber or polyamide fiber.

6. An organic fiber-reinforced composite resin molded article obtained by molding the organic fiber-reinforced composite resin composition according to claim 1.

7. The organic fiber-reinforced composite resin molded article according to claim 6, wherein the molding method is injection molding.

8. The organic fiber-reinforced composite resin composition according to claim 1, wherein the composition has an Izod impact strength at −40° C. of 10 kJ/m$^2$ or more.

9. The organic fiber-reinforced composite resin composition according to claim 1, wherein the composition has a flexural modulus of 1,500 MPa or more.

10. The organic fiber-reinforced composite resin composition according to claim 1, wherein the composition has a tensile elongation at break of 25% or more.

* * * * *